(12) United States Patent
Peuker et al.

(10) Patent No.: US 7,341,132 B2
(45) Date of Patent: Mar. 11, 2008

(54) DAMPER WITH FLEXIBLE GUIDING DAMPING UNIT

(75) Inventors: Thomas Peuker, Ammerthal (DE); Andreas Pelczer, Wassertrüdingen (DE)

(73) Assignee: Suspa Holding GmbH, Altdorf (DE)

( * ) Notice: Subject to any disclaimer, the term of this patent is extended or adjusted under 35 U.S.C. 154(b) by 159 days.

(21) Appl. No.: 11/060,482

(22) Filed: Feb. 18, 2005

(65) Prior Publication Data

US 2005/0183912 A1 Aug. 25, 2005

(30) Foreign Application Priority Data

Feb. 20, 2004 (DE) .................... 10 2004 008 843

(51) Int. Cl.
*F16F 11/00* (2006.01)
(52) U.S. Cl. .................. 188/381; 188/322.17
(58) Field of Classification Search ........... 188/322.16, 188/322.17, 322.18, 129, 381
See application file for complete search history.

(56) References Cited

U.S. PATENT DOCUMENTS

| | | | |
|---|---|---|---|
| 5,806,840 A | | 9/1998 | Peters |
| 5,964,454 A | | 10/1999 | Volpel |
| 6,264,014 B1 | * | 7/2001 | Ferlicca ....................... 188/129 |
| 6,318,526 B1 | * | 11/2001 | Kruckemeyer et al. 188/322.17 |
| 2006/0054440 A1 | * | 3/2006 | Peuker et al. ................ 188/381 |

FOREIGN PATENT DOCUMENTS

| | | | |
|---|---|---|---|
| DE | 16 25 448 B | | 12/1969 |
| DE | 70 00 116 U | | 1/1970 |
| DE | 81 37 510 U1 | | 5/1982 |
| DE | 196 15 010 A1 | | 10/1997 |
| DE | 199 59 031 C1 | | 3/2001 |
| EP | 816710 A1 | * | 1/1998 |
| FR | 1167999 | * | 12/1958 |
| GB | 2006916 A | * | 5/1979 |
| JP | 2003-240048 A | | 8/2003 |

* cited by examiner

*Primary Examiner*—Thomas Williams
(74) *Attorney, Agent, or Firm*—Browdy and Neimark, PLLC

(57) ABSTRACT

In a damper, in particular for spin-drying cylinder washing machines, it is provided, with a view to obtaining low-noise and low-wear guidance of a tappet in a casing, that the damper comprises a guiding damping unit which damps any deflections of the tappet in the radial direction and centers the tappet in the casing.

23 Claims, 10 Drawing Sheets

DAMPER WITH FLEXIBLE GUIDING DAMPING UNIT

BACKGROUND OF THE INVENTION

1. Field of the Invention

The invention relates to a damper comprising a flexible guiding damping unit in particular for spin-drying washing machines.

2. Background Art

Dampers of the generic type are known for example from DE 196 15 010 A1. Owing to low-cost manufacture, there is undesired play between the tappet and casing in those dampers. Upon operation of a washing machine that comprises those dampers, undesired noise develops by the tappet hitting against the casing. Moreover, the lifetime of those dampers is reduced as a result of increased wear between the tappet and the casing.

SUMMARY OF THE INVENTION

It is an object of the invention to develop a damper of the type mentioned at the outset in such a way that low-noise and low-wear guidance of the tappet in the casing is ensured, accompanied with manufacture at a low cost.

This object is attained by the features including a substantially tubular casing which has a central longitudinal axis and an end on the side of a tappet and a free end; a tappet which is displaceably guided in the casing and projects from the end on the side of the tappet, having a central longitudinal axis and an end inside the casing and a free end; fastening elements which are mounted on the free end of the casing and on the free end of the tappet; a frictional damping unit for producing a given frictional damping effect between the casing and the tappet; and a guiding damping unit for damping and centering any deflection of the tappet crosswise of the central longitudinal axis of the casing. The gist of the invention resides in providing the damper with a guiding damping unit that will attenuate any radial deflections of the damper and center the tappet in the casing.

Additional features and advantages of the invention will become apparent from the ensuing description of five exemplary embodiments of the invention, taken in conjunction with the drawing.

DESCRIPTION OF PREFERRED EMBODIMENTS

Figure 1:
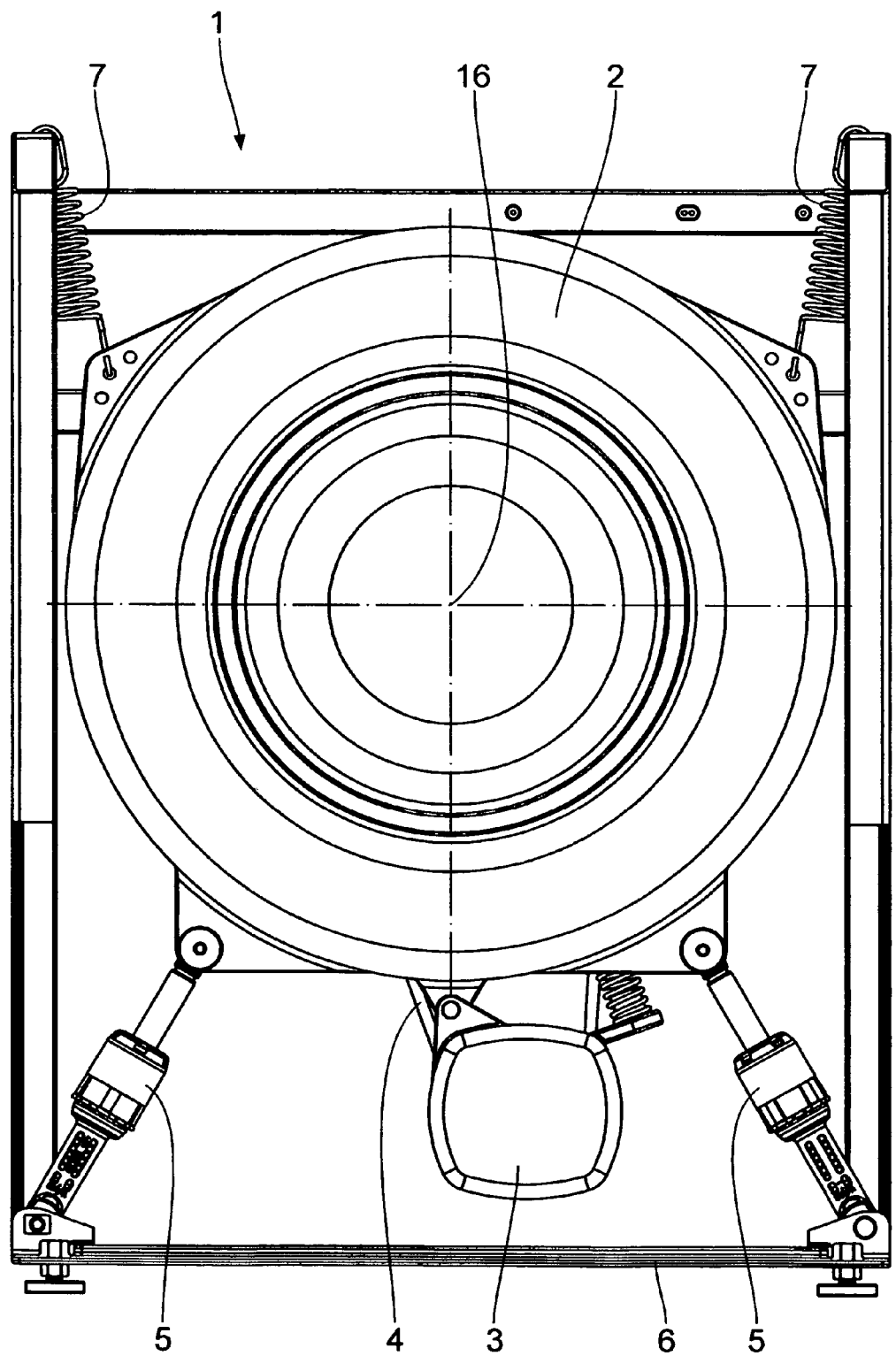
FIG. 1 is a diagrammatic elevation of a first embodiment of a cylinder washing machine with dampers.

The following is a detailed description of a damper comprising a guiding damping unit according to a first embodiment, taken in conjunction with FIGS. 1 to 4. A cylinder washing machine comprises a vibratory washing aggregate 2 with a driving motor 3 which actuates a washing cylinder (not shown in detail) via a belt drive 4. By way of two dampers 5, which are going to be described in detail, the vibratory washing aggregate 2 supports itself on a basic machine frame 6 on the ground. Additionally, the washing aggregate 2 is vibratorily suspended on the machine frame 6 by means of helical extension springs 7. Consequently, the washing aggregate 2 combines with the dampers 5 and the helical extension springs 7, constituting a spring-damper system vibratorily lodged in the machine frame 6 for damping any imbalances during spin-drying jobs of the washing cylinder.

Each damper 5 comprises a substantially tubular casing 8 with a central longitudinal axis 9. Tubular casings are understood to be casings of round as well as noncircular, in particular rectangular cross-sectional shape. The free end 10 of the tubular casing 8 is closed by a bottom 11. A first fastening element 12 is fixed to the outside of the bottom 11, including a first bearing 13 and a bearing bush 14 which is fixed inside the bearing 13. By means of the first fastening element 12, the damper 5 is mounted on the machine frame 6 for pivotability in relation to the washing aggregate 2 about a pivoting axis 15 which is parallel to the cylinder axis of rotation 16.

The damper 5 further comprises a tappet 17 which possesses a central longitudinal axis 18 and, on its free end 19, a second fastening element 20 with a second bearing 21. The second fastening element 20 is inserted into the free end 19 of the tubular tappet 17, where it is fixed by positive fit so that the second fastening element 20 closes the free end 19. By way of the second fastening element 20, the damper 5 is mounted on the washing aggregate 2 in such a way that the damper 5 is rotatable about a second pivoting axis 22 which is also parallel to the cylinder axis of rotation 16.

By its end 23, inside the casing 8, the tappet 17 is inserted into the end 24 of the casing 8 on the side of the tappet 17. Upon ideal guidance of the tappet 17 inside the casing 8, the central longitudinal axis 9 of the casing 8 and the central longitudinal axis 18 of the tappet 17 coincide. In the direction of the central longitudinal axes 9, 18, the motion of the tappet 17, which is displaceably mounted in the casing 8, is damped by a frictional damping unit 26. The frictional damping unit 26 is disposed inside a casing cup 27. The casing cup 27 has a bottom 28 which is pierced by the end 24 of the casing 8 on the side of the tappet 17, the cup 27 and the casing 8 being one piece. The end 24 on the side of the tappet 17 extends as far as approximately to the middle of the casing cup 27.

The frictional damping unit 26 comprises an annular frictional damping lining 29, a contact-pressure-piston component 30, a fastening-piston component 31 and a first spring 32 as well as a second spring 33. The annular frictional damping lining 29 rests on the outside wall of the tappet 17; it is pressed against the outside wall of the tappet 17 by the contact-pressure-piston component 30 and held in the direction of the free end 19 of the tappet 17. In the direction of the end 23, inside the casing 8, of the tappet 17, the frictional damping lining 29 is held by the fastening-piston component 31. In the direction of the central longitudinal axes 9, 18, the end of the fastening-piston component 31 that is turned towards the inside wall of the casing cup 27 comprises an annular locking projection 34 which combines with the end of the contact-pressure-piston component 30 that is turned towards the end 23, inside the casing 8, of the tappet 17, forming a rear recess of positive fit and fixing the fastening-piston component 31 and the contact-pressure-piston component 30. The first spring 32 is pre-loaded between a stop 35 of the fastening-piston component 31 and an annular stop 36 on the inside wall of the casing cup 27 in vicinity to the bottom 28 thereof. By contrast, the second spring 33 is pre-loaded between a stop 37 of the contact-pressure-piston component 30 and a stop 38 of a cap 39.

The cap 39 is cup-shaped too, on its bottom 40 having a guiding damping unit 41 which the free end 19 of the tappet 17 passes through and which serves for damping any deflection of the tappet 17 crosswise of the central longitudinal axis 9 of the casing 8 and for centering the tappet 17. The cap 39 has a greater diameter than the cup 27; it is pushed over the cup 27 in the direction of tappet insertion 42 and fixed thereto. Fixing takes place by means of locking noses 43 which combine with the outer wall of the cup 27, forming rear recesses.

The following is a detailed description of the cap 39 and the guiding damping unit 41. The cap 39 comprises a basic cap structure 44 which tapers in the direction of the bottom 40 of the cap 39, having ventilation apertures 45 uniformly distributed along the circumference. The guiding damping unit 41 is disposed inside the bottom 40, having a tappet inlet 46; the unit 41 and the basic cap structure 44 are integral. From the non-tapered end of the basic cap structure 44, fastening ribs 48 extend in the direction of a central longitudinal axis 47 of the cap 39 which is identical with the central longitudinal axis 9 of the casing 8; they are regularly distributed along the circumference and, by their free ends, joined to a fastening ring 49, possessing the locking noses 43 on their inside wall in proximity to their free ends.

The guiding damping unit 41 is comprised of several annularly disposed damping elements 50 which are formed in one piece with the cap 39. The unit 41 is integrally injection-molded from plastic material, in particular POM or polyamide. The damping elements 50 are regularly distributed along the circumference, related to the central longitudinal axis 47 of the cap 39, two of the damping elements 50 at a time facing each other diametrically as related to the central longitudinal axis 47 of the cap 39. Each damping element 50 has a U-shaped profile with an inner rib portion 51 and an outer rib portion 52 which is longer than the inner rib portion 51, the outer rib portion 52 being curved in accordance with an outside radius and the inner rib portion 51 being curved in accordance with an inside radius as related to the central longitudinal axis 47 of the cap 39 and the outside radius being greater than the inside radius. The inner rib portion 51 and the outer rib portion 52 are interconnected by a curved connecting rib portion 53 and jointly enclose a chamber 66 which is open only in the axial direction. The outer rib portion 52 additionally possesses a radially inward stop 55 in the shape of a wedge which defines the mobility of the inner rib portion 51 radially outwards. It is also possible to define the radial motion of the rib portions without a stop. To this end, the stability and geometry of the rib portions must be selected suitably. The guiding damping unit 41 is rotationally symmetrical of the central longitudinal axis 47 of the cap 39 by an angle of 360° divided by the number of damping elements 50. The spring characteristic of the damping elements 50 is adjustable by way of their geometry. Owing to the one-piece design of the damping elements 50, the inner rib portions 51 thereof form a closed inner ring 67 and the outer rib portions 52 an outer ring, both rings being interconnected by the connecting rib portions 53. The tappet 17 slides on the ring 67 by some play.

The following is a detailed description of the mode of operation of the damper 5 with the guiding damping unit 41. Upon operation of the cylinder washing machine 1, loads act on the damper 5 as a result of imbalances of the washing cylinder of the washing aggregate 2 in the direction of its central longitudinal axes 9, 18, 47 and crosswise thereof. The ensuing description proceeds from a sudden rise in the stimulation of load on the tappet 17 in the direction of tappet insertion 42. A first case of stimulation of load on the tappet 17 precisely in the direction of the central longitudinal axis 9 of the casing 8 is differentiated from another case in which stimulation does not take place precisely in the direction of the central longitudinal axis 9 i.e., there is a transverse-load component.

Figure 2:
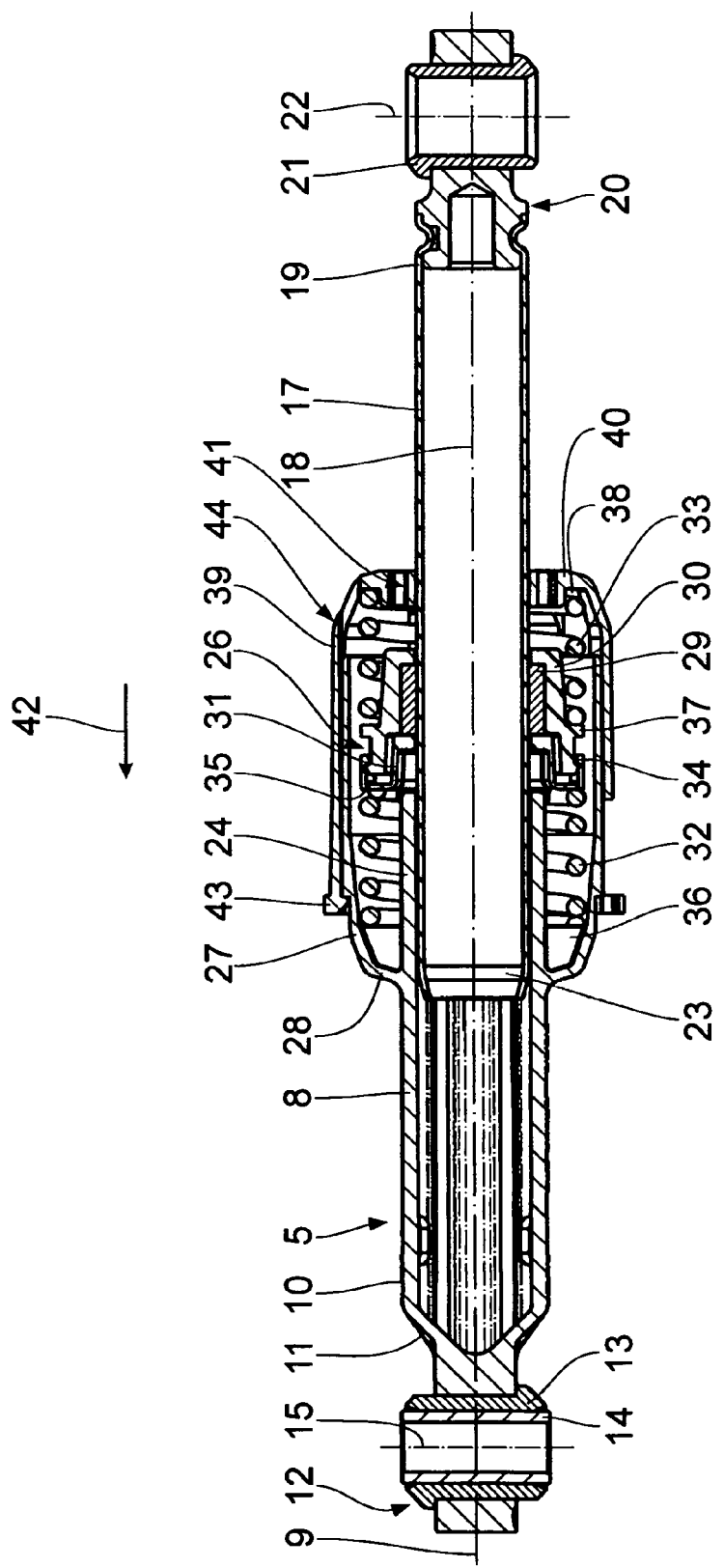
FIG. 2 is a longitudinal sectional view of a damper of FIG. 1.
Figure 3:
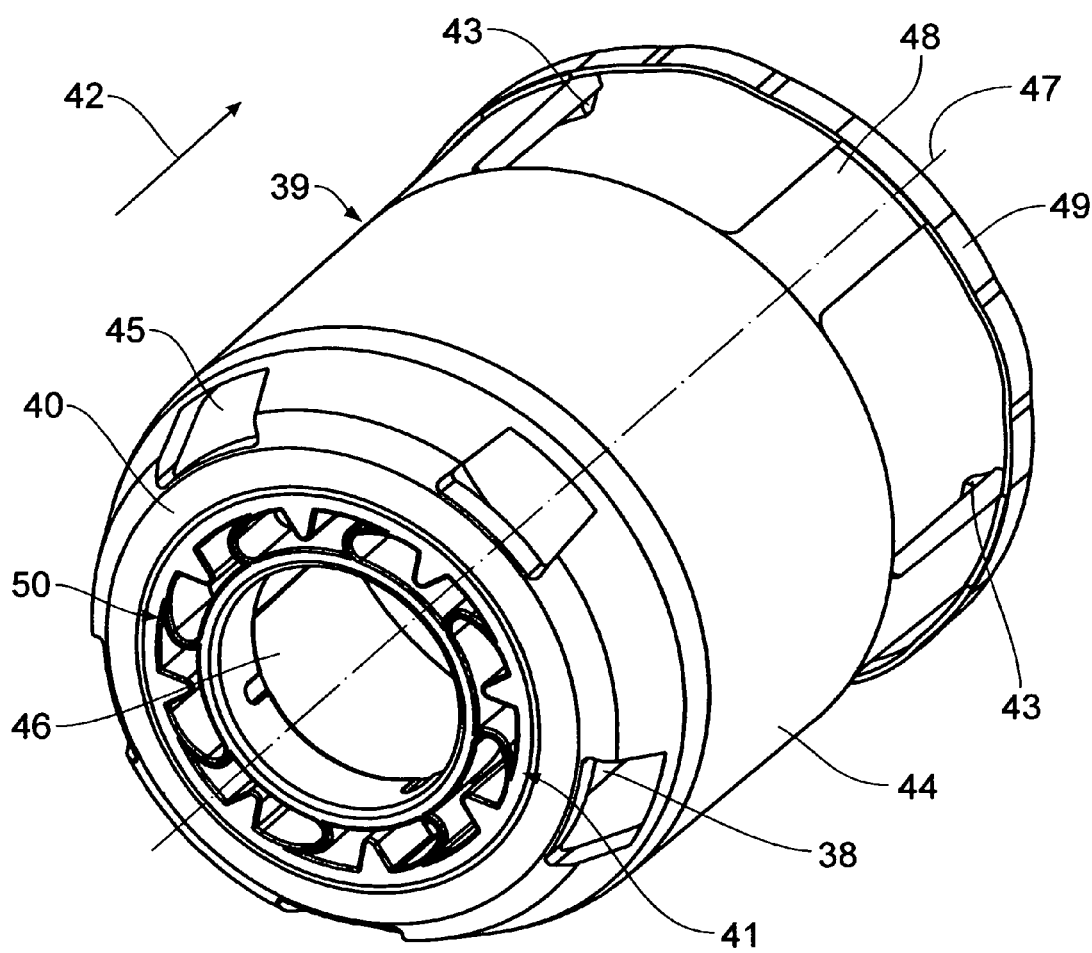
FIG. 3 is a perspective illustration of a guiding damping unit of the damper of FIG. 2.
Figure 4:
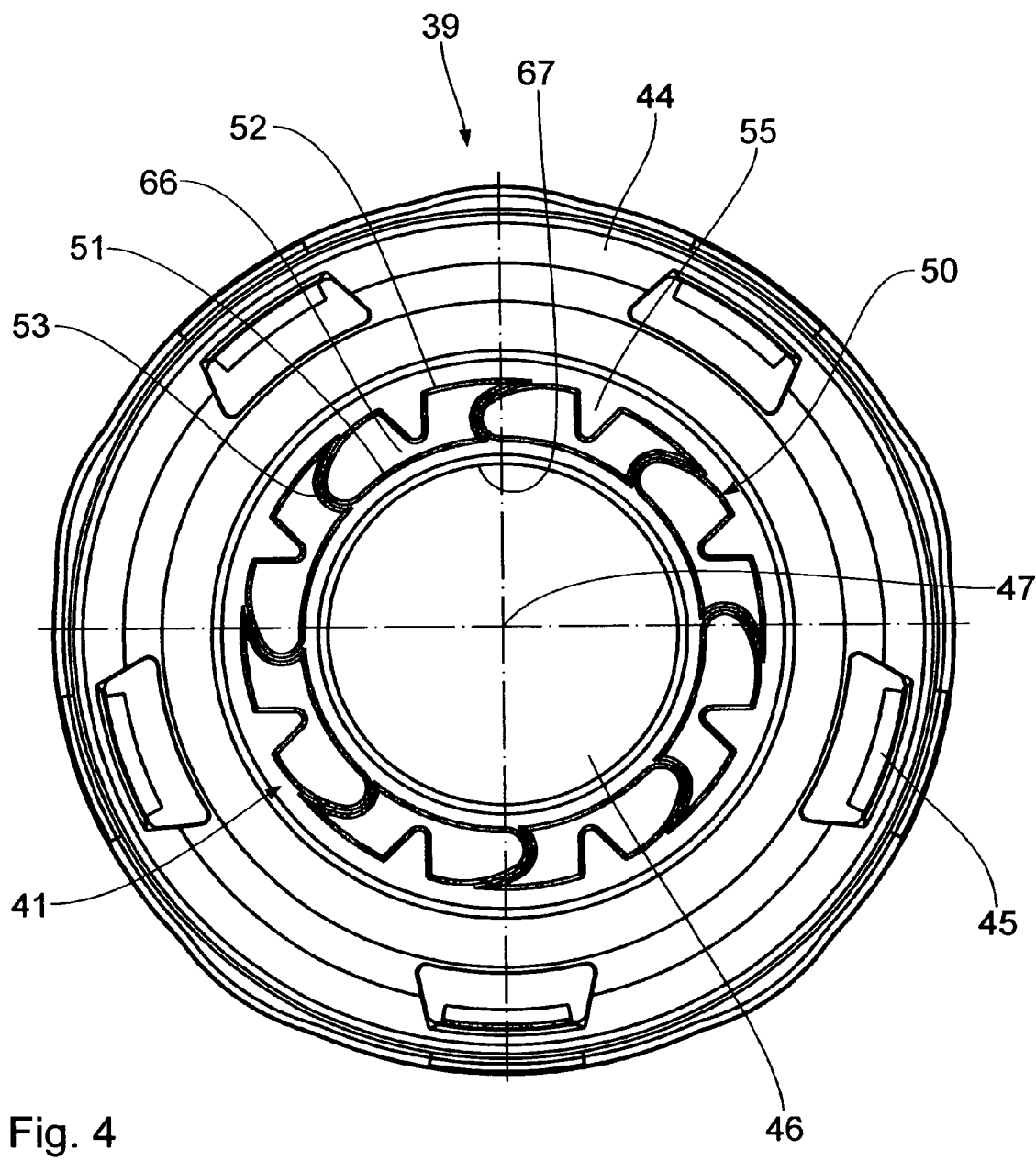
FIG. 4 is a plan view of the guiding damping unit of FIG. 3.

Proceeding from the position of rest of the damper 5 seen in FIG. 2, the tappet 17 moves precisely in the direction of the central longitudinal axis 9 of the casing 8 in the direction of tappet insertion 42 in the first case of actuation of the tappet 17 by load. Upon insertion, the central longitudinal axis 18 of the tappet 17 is identical with the central longitudinal axis 9 of the casing 8, there being no transverse-load component. As a result of the friction between the frictional damping lining 29 and the outside wall of the tappet 17, the frictional damping lining 29, together with the contact-pressure-piston component 30 and the fastening-piston component 31, is being entrained by the motion of insertion of the tappet 17 in the direction of tappet insertion 42. During this motion of insertion, the fastening-piston component 31 slips over the end 24 of the casing 8 on the side of the tappet 17, loading the first spring 32. If the spring load of the increasingly loaded first spring 32 exceeds the frictional force that acts between the frictional damping lining 29 and the tappet 17, the result is reversion of the motion of the frictional damping lining 29 and the contact-pressure-piston component 30 and the fastening-piston component 31 so that the first spring 32 relaxes partially. The frictional damping lining 29 now moves counter to the direction of tappet insertion 42 and, as a result of the frictional force, brakes the motion of the tappet 17 in the direction of tappet insertion 42 until there is a reversion of motion of the tappet 17. As the motion of the tappet 17 and of the frictional damping lining 29 proceeds counter to the direction of tappet insertion 42, the first spring 32 relaxes more and more, whereas the second spring 33 is being loaded increasingly. If the spring load of the second spring 33 exceeds the frictional force that acts between the frictional damping lining 29 and the tappet 17, there will be a renewed reversion of the motion of the frictional damping lining 29 together with the contact-pressure-piston component 30 and the fastening-piston component 31, with the second spring 33 again relaxing. As a result of the frictional force that acts between the frictional damping lining 29 and the tappet 17, the motion of the tappet 17 counter to the direction of tappet insertion 42 is again being braked until there is also a reversion of motion of the tappet 17.

That motional process is repeated several times. Consequently, the tappet 17 performs damped vibration within the casing 8. Upon stimulation of load precisely in the direction of the central longitudinal axis 9 of the casing 8, the guiding damping unit 41 only has the function of additional guidance of the tappet 17. The damping elements 50 are not active in that case.

As regards the second case of load stimulation not precisely in the direction of the central longitudinal axis 9 of the casing 8, the stimulation of load can be divided into a component in the direction of the central longitudinal axis 9 of the casing 8 and into another component crosswise of the central longitudinal axis 9. As for the load component in the direction of the central longitudinal axis 9 of the casing 8, the mode of operation of the damper 5 is the same as described in the first case. The load component crosswise of the central longitudinal axis 9 of the casing 8 leads to deflection of the free end 19 of the tappet 18 crosswise of the central longitudinal axis 9 of the casing 8, the central longitudinal axis 18 of the tappet 17 no longer coinciding with the central longitudinal axis 9 of the casing 8. The deflection of the tappet 17 crosswise of the central longitudinal axis 9 of the casing 8 is damped by the guiding damping unit 41 so that centering of the tappet 17 takes place in such a way that the central longitudinal axis 18 of the tappet 17 again coincides with the central longitudinal axis 9 of the casing 8.

The ensuing description of the mode of operation of the guiding damping unit 41 proceeds from the assumption that the transverse-load component works on a plane that intersects the central longitudinal axis 47 of the cap 39 and two opposed stops 55 of two diametrically opposed damping elements 50. As a result of the transverse load component, the inner rib portion 51 of the damping element 50 moves radially outwards. In doing so, the connecting-rib portion 53 is loaded such that spring load originates in the direction of the central longitudinal axis 47 of the cap 39. This spring load brakes any radial deflection of the tappet 17 and leads to a reversion of motion of the tappet 17 in the direction of the central longitudinal axis 47 of the cap 39. In the moving process specified, the inner rib portion 51 of the diametrically opposed damping element 50 is first being moved in the direction of the central longitudinal axis 47 of the cap 39, with the connecting-rib portion 53 also building up spring load, however of radially outward action. This also results in that the motion of the tappet 17 in the transverse direction is being braked and damped. The friction losses that are responsible for the damping effect primarily originate in the material structure of the damping elements 50 as a result of lossy flexible deformation. What imports is the reduction of energy of motions in the radial direction. Consequently, the guiding damping unit 41 serves for damping any deflection of the tappet 17 crosswise of the central longitudinal axis 9 of the casing 8 and for simultaneously centering the tappet 17 after disappearance of the transverse-load component. In case of transverse-load components of great amplitude, any deflection of the tappet 17 is defined by the wedge-shaped, projecting stops 55. Consequently, the damper 5 and the guiding damping unit 41 lead to clearly reduced noises of the damper 5 during operation of the cylinder washing machine 1 and to clearly reduced wear of the damper 5 as a result of the tappet 17 being permanently centered.

Figure 5:
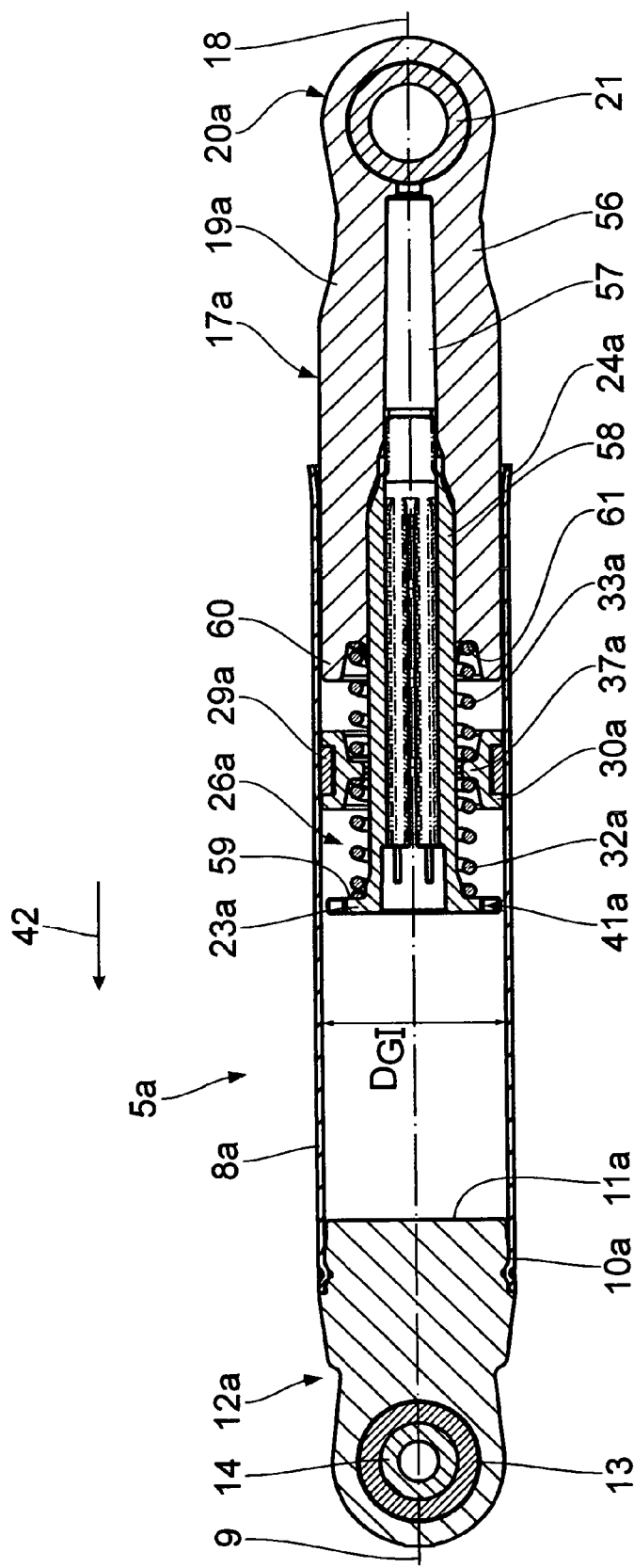
FIG. 5 is a longitudinal sectional view of a second embodiment of a damper.
Figure 6:
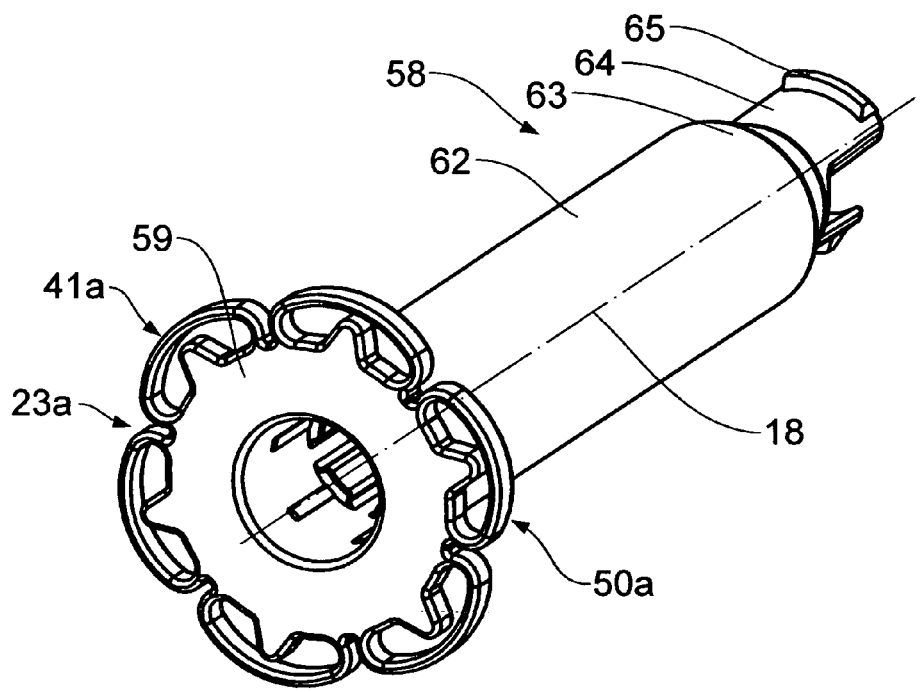
FIG. 6 is a perspective view of a guiding damping unit of the damper of FIG. 5.
Figure 7:
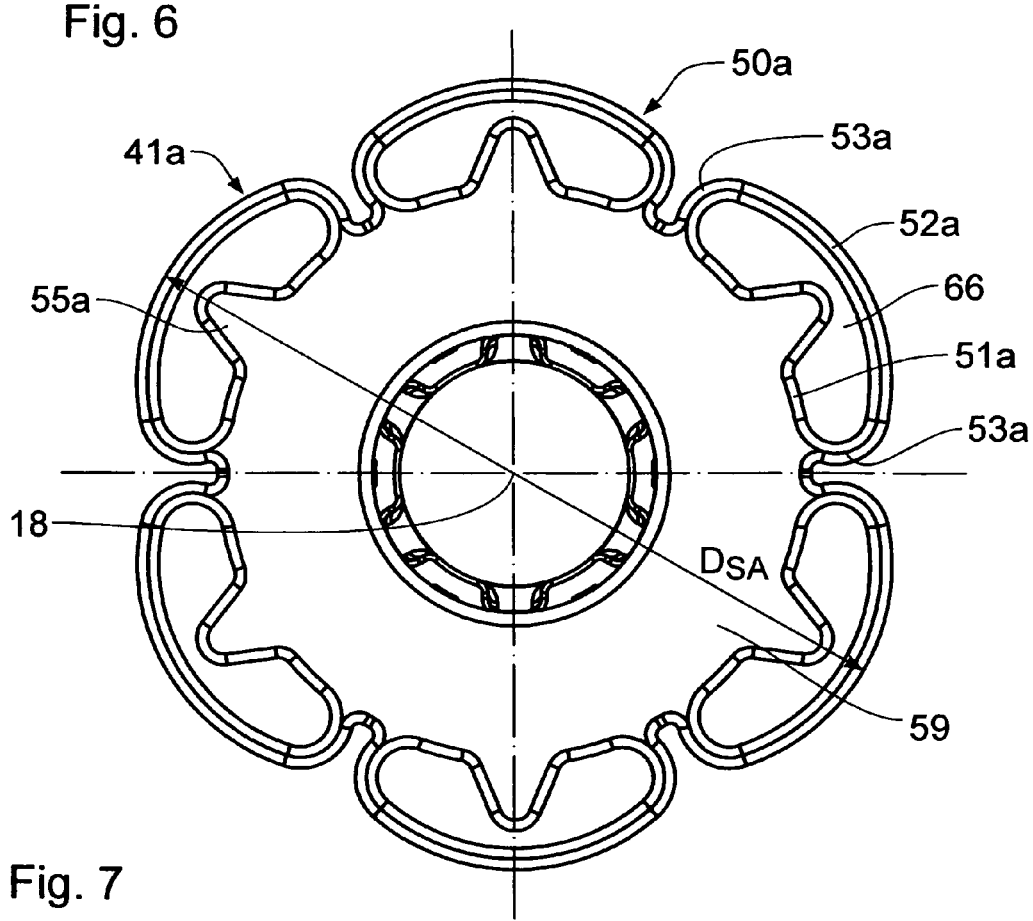
FIG. 7 is a plan view of the guiding damping unit of FIG. 6.

The following is a description of a second embodiment of the invention, taken in conjunction with FIGS. 5 to 7. Parts of identical construction have the same reference numerals as in the first embodiment, to the description of which reference is made. Parts that differ in construction, but are functionally identical, have the same reference numerals with an a annexed. The decisive difference from the first embodiment resides in that the frictional damping coating 29a passes by friction along the inside wall of the casing 8a. To this end, the tappet 17a is of two-piece design, with the first tappet component 56 being integral with the second fastening element 20a and a blind hole 57 that is concentric of the central longitudinal axis 18 of the tappet 17a varying in diameter for connection to a second tappet component 58 by positive fit and frictional engagement. The precise design of the blind hole 57 is not going to be explained in detail. The second tappet component 58 is substantially tubular, having a diameter inferior to that of the first tappet component 56. The end 23a, inside the casing 8a, of the second tappet component 58 is provided with an annular tappet stop 59 of enlarged diameter which supports the guiding damping unit 41a. The end 60 of the first tappet component 56 has an annular stop 61 which is recessed in the shape of a wedge. Between the end 60 and the end 23a, inside the casing 8a, of the tappet 17a, provision is made for the contact-pressure component 30a with the frictional damping lining 29a. The contact-pressure-piston component 30a is a U-shaped ring, bilaterally holding the frictional damping lining 29a. On the wall of the contact-pressure-piston component 30a that is turned towards the central longitudinal axis 9 of the casing 8a, a contact-pressure-piston stop 37a is provided, which projects radially. The first spring 32a is pre-loaded between the tappet stop 59 and the wall of the contact-pressure-piston stop 37a which is turned towards the end 23a of the tappet 17a inside the casing 8a. As opposed to this, the second spring 33a is pre-loaded between the stop 61 of the tappet component 56 and the wall of the contact-pressure-piston stop 37a turned towards the end 60 of the tappet component 56. The first fastening element 12a and the casing 8a form two pieces, the fastening element 12a being united with the free end 10a of the casing 8a by positive fit.

Consequently, the first fastening element 12a constitutes the bottom 11a of the casing 8a. The second tappet component 58 and the guiding damping unit 41a are going to be described in detail below. The second tappet component 58 has a tubular basic tappet structure 62, the end 63 of which tapers, with two fastening projections 64 being disposed thereon, which extend in the direction of the central longitudinal axis 18 of the tappet 17a, each having a fastening nose 65. The disk-shaped tappet stop 59 is integral with the basic tappet structure 62 and the guiding damping unit 41a. Various reinforcing elements are provided inside the basic tappet structure 62, which are not going to be explained in detail.

The guiding damping unit 41a is composed of six damping elements 50a of annular arrangement, which face each other diametrically and are spaced from, and uniformly distributed relative to, the central longitudinal axis 18a of the tappet 17a. Each damping element 50a comprises an inner rib portion 51a and an outer rib portion 52a, the outer rib portion 52a being bent by an outside radius and the inner rib portion 51a by an inside radius, and the inside radius exceeding the outside radius. The inner rib portion 51a centrally comprises a stop 55a that projects radially in the direction of the outer rib portion 52a. Each damping element 50a is symmetrical of a plane that intersects the central longitudinal axis 18 of the tappet 17a and the tip of the stop 55a which belongs to the damping element 50a. The outer rib portion 52a is bilaterally connected to the inner rib portion 51a via a connecting-rib portion 53a such that the individual rib portions pass seamlessly into each other. The portions 51a, 52a and 53a enclose a double-reniform chamber 66 which is open only in the axial direction. The outside diameter DSA of the guiding damping unit 41a is defined as the maximal distance from each other of two opposed outer rib portions 52a in the relaxed condition seen in FIGS. 6 and 7. The casing 8a has an inside diameter $D_{GI}$. $D_{SA}<D_{GI}$ applies, which means that there is always some play between the portions 52a and the inside wall of the casing 17a.

The mode of operation of the damper 5a is analogous to that of the first embodiment. In the case of actuation of the tappet 17a by suddenly rising load in the direction of the central longitudinal axis 9 of the casing 8a, the only difference resides in that the frictional damping lining 29a bears by friction against the inside wall of the casing 8a and guidance of the guiding damping unit 41a takes place on the inside wall of the casing 8a. In the second case of an existing transverse-load component, the deflection of the tappet 17a is also damped by the guiding damping unit 41a and the tappet 17a is centered relative to the central longitudinal axis 9 of the casing 8a. Assuming that the transverse-load component acts on the plane that intersects the central longitudinal axis 18 of the tappet 17a and the tip of the stop 55a of a damping element 50a, the outer rib portion 52a of the respective damping element 50a is being moved flexibly in the direction of the central longitudinal axis 18 of the tappet 17a so that spring load builds up, counteracting the transverse-load component. As a result, the deflection of the tappet 17a crosswise of the central longitudinal axis 18 is being braked until there is reversion of the motion of the tappet 17a. The outer rib portion 52a now moves from the central longitudinal axis 18 radially outwards. Owing to friction losses in the material of the damping elements 50a and friction losses between the guiding damping unit 41a and the inside wall of the casing 8a, the vibratory operation crosswise of the central longitudinal axis 18 that is performed by the tappet 17a is being damped so that the tappet 17a is again centered relative to the central longitudinal axis 9 of the casing 8a after disappearance of the transverse-load component. In case of a transverse-load component of great amplitude, the motion of the outer rib portion 52a is defined by the stop 55a.

Figure 8:
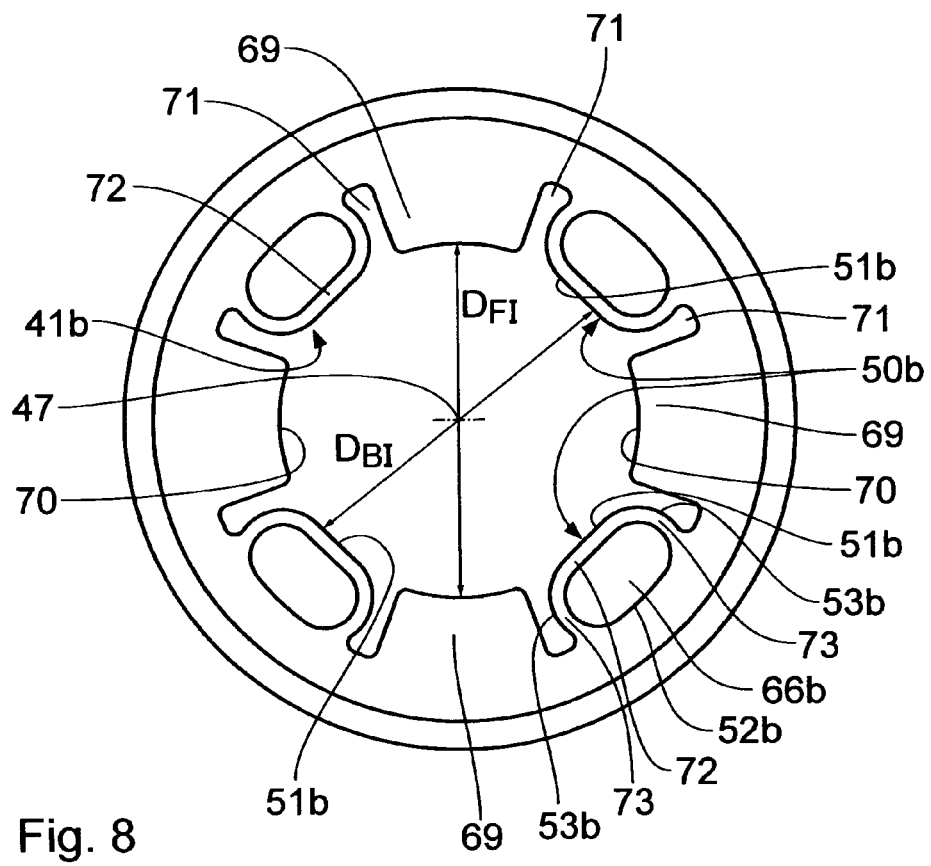
FIG. 8 is a plan view of a third embodiment of a guiding damping unit.
Figure 9:
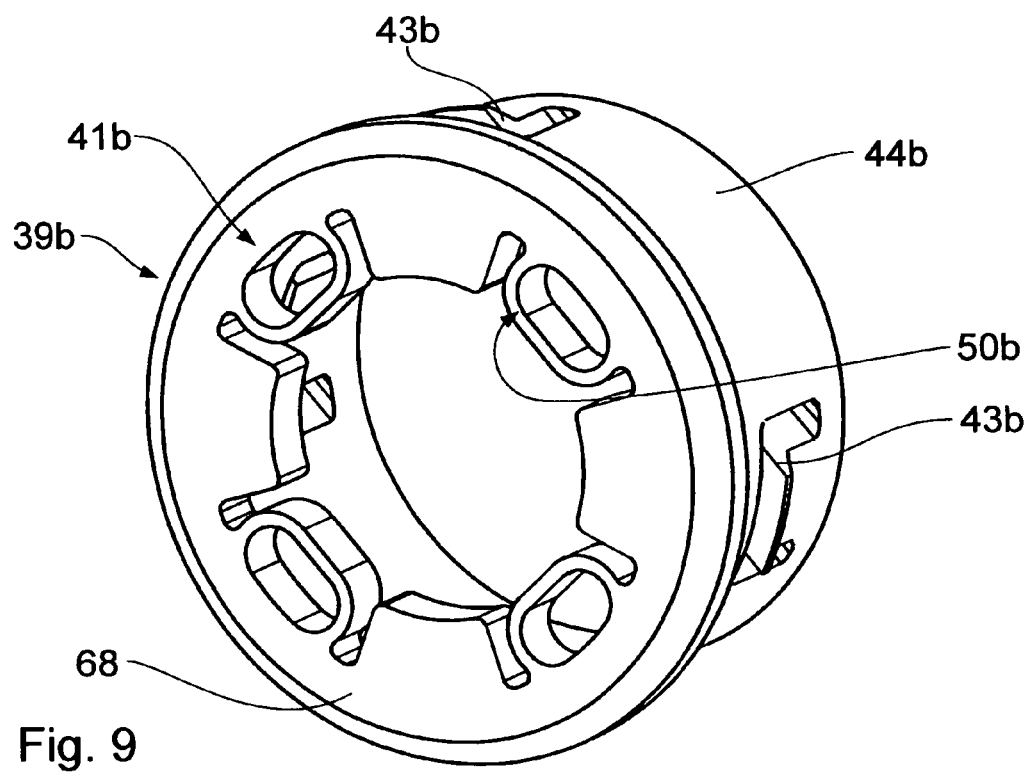
FIG. 9 is a perspective view of the guiding damping unit of FIG. 8.

The following is a description of a third embodiment of the invention, taken in conjunction with FIGS. 8 and 9. Identical parts have the same reference numerals as in the first embodiment, to the description of which reference is made. Parts that differ in construction, but are functionally identical, have the same reference numerals with a b annexed. The substantial difference from the first embodiment resides in the configuration of the guiding damping unit 41b. Like in the first embodiment, the guiding damping unit 41b is fixed to the cap 39b. Unlike the first embodiment, the cap 39b is not pushed over the casing cup 27 but into it so that the locking noses 43b that are disposed on the cap 39b stand out radially, snap-engaging from inside with corresponding recesses in the casing cup 27. The cap 39b comprises four damping elements 50b which are uniformly distributed along the circumference and project inwards from an annular edge 68. The inner rib portion 51b as well as the connecting rib portions 53b constitute a flexibly compressible spring arm or bow which projects inwards in the shape of a bow. It encloses a chamber 66b of oval cross-sectional shape which is open only in the axial direction. Between two adjacent damping elements 50b, provision is made for a guide rib 69 which projects inwards from the edge 68 and the inner surfaces 70 of which that are turned towards the axis 47 have the cross-sectional shape of a radius around the axis 47. The diameter in the vicinity of two opposed inner rib portions 51b is designated by $D_{BI}$. The diameter in the vicinity of two opposed guide ribs 69 is designated by $D_{FI}$. $D_{FI}>D_{BI}$ applies, which means that the inner rib portions 51b stand out further in the direction towards the axis 47 than the inner surfaces 70 of the guide ribs 69. The tappet 17 has some play towards the portions 51b. Consequently, the tappet 17, when tilted, first rests on the inner rib portions 51b. If it is more strongly tilted, guidance of the tappet 17 is ensured by the inner surfaces 70. A groove 71 of substantially radial extension is arranged between a damping element 50b and a guide rib 69, freeing the curved connecting rib portion 53b and offering sufficient space for deformation of the rib portion 53b upon compression.

As regards the mode of operation of the guiding damping unit 41b, reference is made to the explanations of the first embodiment. Advantages reside in that the damping elements 50b are able to take deformations more easily, because they are not connected by a joint inner ring 67 as in the first embodiment. Moreover, the guide ribs 69 provide for stable guidance in the case of stronger tilting.

Figure 10:
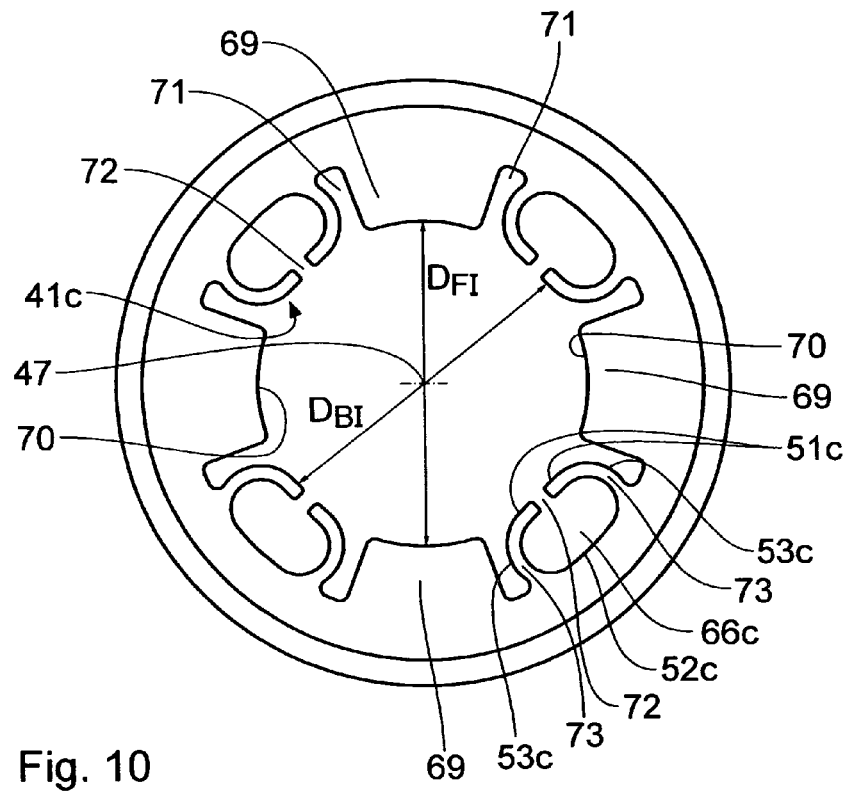
FIG. 10 is a plan view of a fourth embodiment of a guiding damping unit.
Figure 11:
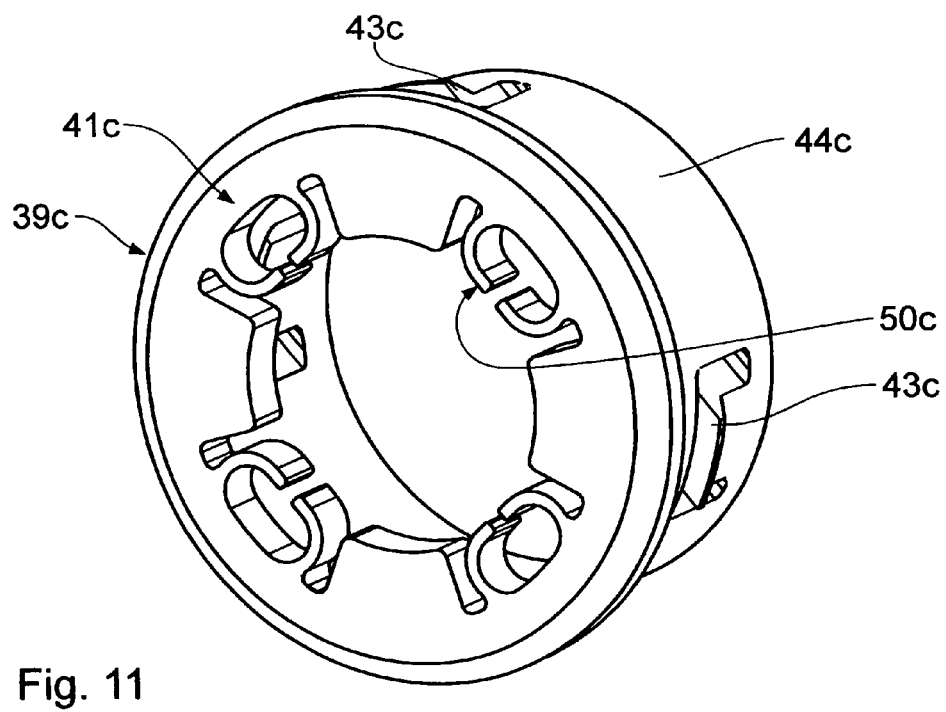
FIG. 11 is a perspective view of the guiding damping unit of FIG. 10.

A fourth embodiment of the invention will be described below, taken in conjunction with FIGS. 10 and 11. Identical parts have the same reference numerals as in the first embodiment, to the description of which reference is made. Parts that differ in construction, but are functionally identical, have the same reference numerals with a c annexed. The cap 39c has the same design as the cap 39b of the third embodiment with only one exception. The only difference consists in that, in the middle, the inner rib portions 51c are interrupted by a gap 72. In other words, the damping element 50c is formed by two arcs 73 of the cross-sectional shape of quarter circles which are turned towards each other and the free ends of which define the gap 72. An advantages of this arrangement resides in that less force is needed for compressing the arcs 73 in the radial direction. Consequently, more solid materials which are advantageous for the rest of the cap 39c, such as POM, can be used without any change in the damping behaviour.

As regards the mode of operation of the fourth embodiment, reference is made to the third embodiment and thus also to the first embodiment.

Figure 12:
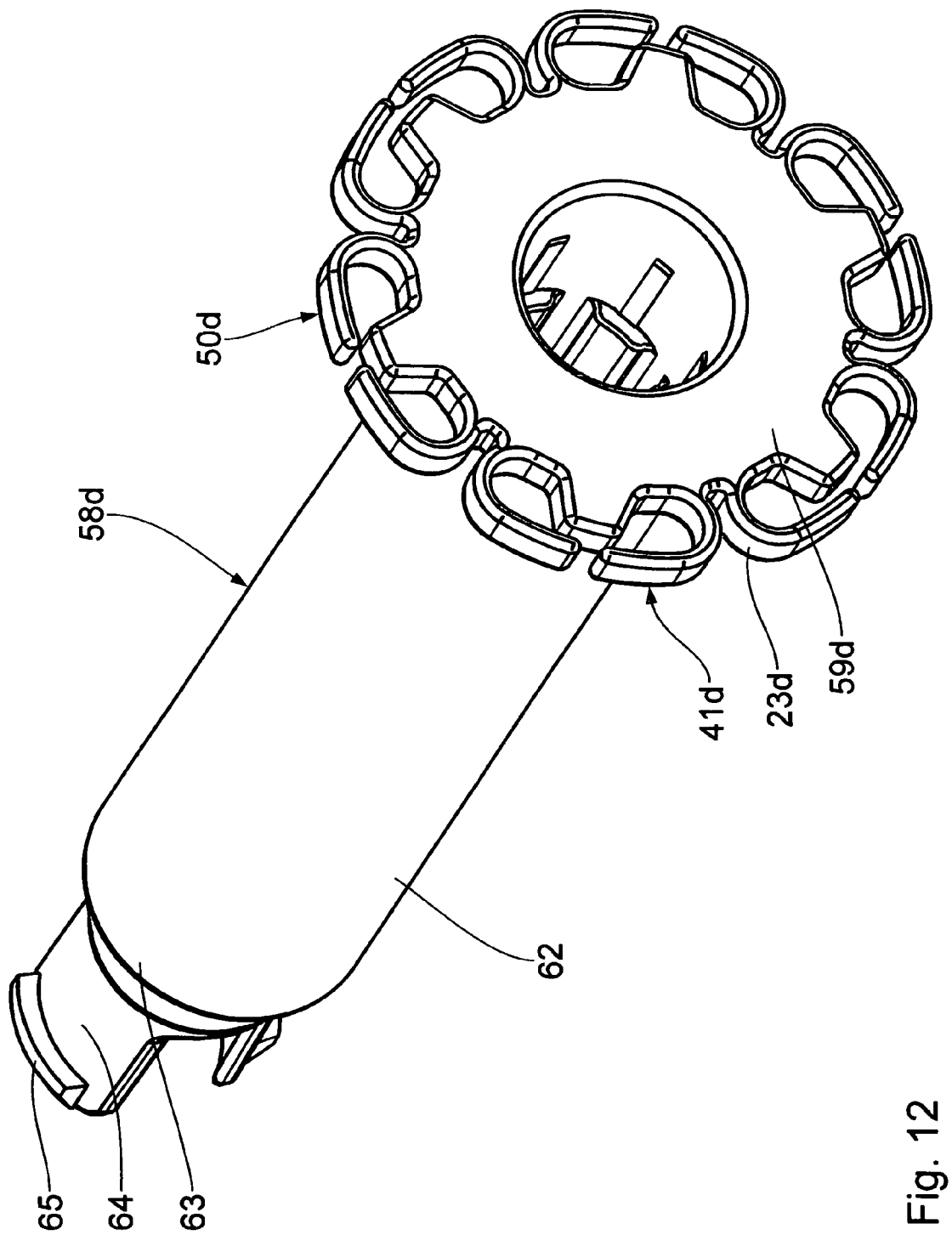
FIG. 12 is a perspective view of a fifth embodiment of a guiding damping unit.
Figure 13:
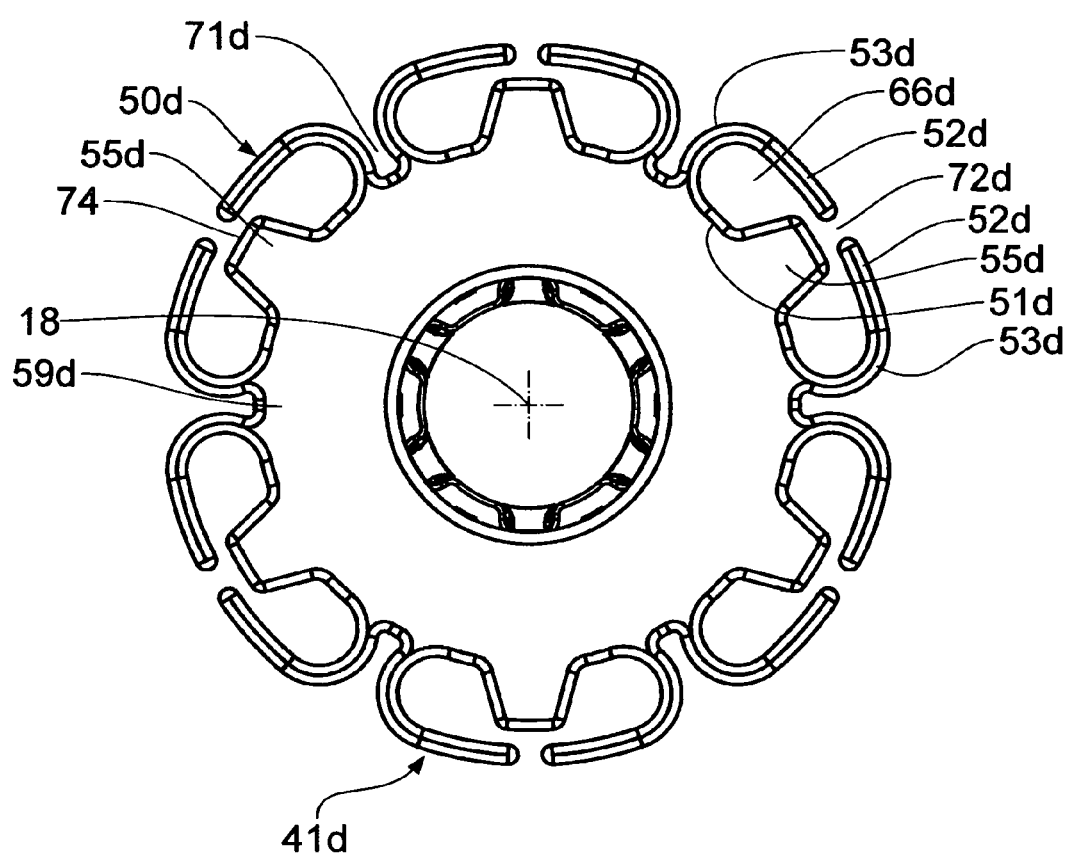
FIG. 13 is a plan view of the guiding damping unit of FIG. 12.

The following is a description of a fifth embodiment of the invention, taken in conjunction with FIGS. 12 and 13. Identical parts have the same reference numerals as in the first embodiment, to the description of which reference is made. Parts that differ in construction, but are identical functionally, have the same reference numerals with a d annexed. The fifth embodiment has substantially the same design as the second embodiment according to FIGS. 5 to 7. The only difference resides in that the outer rib portion 52d is centrally interrupted by a gap 72d, as a result of which the two parts of the rib portion 52d become more flexible, offering the same advantages as in the fourth embodiment according to FIGS. 10 and 11. Like in the second embodiment, a groove 71d is provided between adjacent damping elements 50d, the groove 71d being defined by adjacent rib portions 53d. Unlike the second embodiment, the stop 55d is flattened, meaning that it possesses a saddle 74 which the free ends of the parts of the rib portions 52d will rest on in case of strong compression. As regards the mode of operation, reference is made to the description of the second embodiment.

What is claimed is:

1. A damper comprising
   a) a substantially tubular casing (8; 8*a*) which has a central longitudinal axis (9) and an end (24; 24*a*) on the side of a tappet (17; 17*a*) and a free end (10; 10*a*);
   b) the tappet (17; 17*a*) which is displaceably guided in the casing (8; 8*a*) and projects from the end (10; 10*a*) on the side of the tappet (17; 17*a*), having a central longitudinal axis (18) and an end (23; 23*a*) inside the casing (8; 8*a*) and a free end (19; 19*a*);
   c) fastening elements (12, 20; 12*a*, 20*a*) which are mounted on the free end (10; 10*a*) of the casing (8; 8*a*) and on the free end (19; 19*a*) of the tappet (17; 17*a*);
   d) a frictional damping unit (26; 26*a*) for producing a given frictional damping effect between the casing (8; 8*a*) and the tappet (17; 17*a*); and
   e) a guiding damping unit (41*c*; 41*d*) for damping and centering any deflection of the tappet (17; 17*a*) crosswise of the central longitudinal axis (9) of the casing (8; 8*a*),
   f) wherein the guiding damping unit (41*c*; 41*d*) is composed of several damping elements (50*c*; 50*d*) of annular arrangement, relative to the central longitudinal axis (18),
   g) wherein each damping element (50; 50*d*) possesses at least one curved rib portion (51*c*, 53*c*; 52*d*, 53*d*) which is flexibly movable radially of the central longitudinal axis (9, 18), and
   h) wherein at least one rib portion (51*c*; 52*d*) is of two-piece design, producing a gap (72; 72*d*).

2. A damper according to claim 1, wherein the guiding damping unit (41*c*; 41*d*) is designed for enabling the tappet (17; 17*a*) to be supported flexibly towards the casing (8; 8*a*).

3. A damper according to claim 1, wherein the radial mobility of the rib portion (52*d*; 53*d*) is defined by a stop (55*d*).

4. A damper according to claim 1, wherein a guide rib (69) is disposed between two adjacent damping elements (50*c*).

5. A damper according to claim 1, wherein the guiding damping unit (41*d*) is disposed on the end (23*a*; 23*d*) of the tappet (17*a*) inside the casing.

6. A damper according to claim 1, wherein the guiding damping unit (41*c*) is disposed in the vicinity of the end (24), on the side of the tappet, of the casing (8) and joined to the casing (8).

7. A damper comprising
   a) a substantially tubular casing (8*a*) which has a central longitudinal axis (9) and an end (24*a*) on the side of a tappet (17*a*) and a free end (10*a*);
   b) the tappet (17*a*) which is displaceably guided in the casing (8*a*) and projects from the end (10*a*) on the side of the tappet (17*a*), having a central longitudinal axis (18) and an end (23*a*) inside the casing (8*a*) and a free end (19*a*);
   c) fastening elements (12*a*, 20*a*) which are mounted on the free end (10*a*) of the casing (8*a*) and on the free end (19*a*) of the tappet (17*a*);
   d) a frictional damping unit (26*a*) for producing a given frictional damping effect between the casing (8*a*) and the tappet (17*a*); and
   e) a guiding damping unit (41*a*) for damping and centering any deflection of the tappet (17*a*) crosswise of the central longitudinal axis (9) of the casing (8*a*),
   f) wherein the guiding damping unit (41*a*) is composed of several damping elements (50*a*) of annular arrangement, relative to the central longitudinal axis (18),
   g) wherein each damping element (50*a*) possesses at least one curved rib portion (52*a*, 53*a*) which is flexibly movable radially of the central longitudinal axis (9, 18),
   h) wherein the at least one rib portion (52*a*, 53*a*) is closed, enclosing a chamber (66) that is located there-behind and is open only in the axial direction, and
   i) wherein the guiding damping unit (41*a*) has an outside diameter DSA, which is smaller than an inside diameter DGI of the casing (8*a*).

8. A damper according to claim 7, wherein the radial mobility of the rib portion (52*a*, 53*a*) is defined by a stop (55*a*).

9. A damper according to claim 7, wherein the guiding damping unit (41*a*) is disposed on the end (23*a*) of the tappet (17*a*) inside the casing.

10. A damper comprising
    a) a substantially tubular casing (8; 8*a*) which has a central longitudinal axis (9) and an end (24; 24*a*) on the side of a tappet (17; 17*a*) and a free end (10; 10*a*);
    b) the tappet (17; 17*a*) which is displaceably guided in the casing (8; 8*a*) and projects from the end (10; 10*a*) on the side of the tappet (17; 17*a*), having a central longitudinal axis (18) and an end (23; 23*a*) inside the casing (8; 8*a*) and a free end (19; 19*a*);
    c) fastening elements (12, 20; 12*a*, 20*a*) which are mounted on the free end (10; 10*a*) of the casing (8; 8*a*) and on the free end (19; 19*a*) of the tappet (17; 17*a*);
    d) a frictional damping unit (26; 26*a*) for producing a given frictional damping effect between the casing (8; 8*a*) and the tappet (17; 17*a*); and
    e) a guiding damping unit (41; 41*a*; 41*d*) for damping and centering any deflection of the tappet (17; 17*a*) crosswise of the central longitudinal axis (9) of the casing (8; 8*a*),
    f) wherein the guiding damping unit (41; 41*a*; 41*d*) is composed of several damping elements (50; 50*a*; 50*d*) of annular arrangement relative to the central longitudinal axis (18),
    g) wherein each damping element (50; 50*d*) possesses at least one curved rib portion (51, 53; 52*a*, 53*a*; 52*d*, 53*d*) which is flexibly movable radially of the central longitudinal axis (9, 18),
    h) wherein the radial mobility of the rib portion (51, 53; 52*a*, 53*a*; 52*d*, 53*d*) is defined by a stop (55; 55*a*; 55*d*),
    i) wherein the stop (55; 55*a*; 55*d*) is in the shape of a wedge.

11. A damper according to claim 10, wherein the at least one rib portion (51, 53; 52*a*, 53*a*) is closed, enclosing a chamber (66) that is located there-behind and is open only in the axial direction.

12. A damper according to claim 10, wherein at least one rib portion (52*d*) is of two-piece design, producing a gap (72*d*).

13. A damper according to claim 10, wherein the guiding damping unit (41*a*; 41*d*) is disposed on the end (23*a*; 23*d*) of the tappet (17*a*) inside the casing.

14. A damper according to claim 10, wherein the guiding damping unit (41) is disposed in the vicinity of the end (24), on the side of the tappet, of the casing (8) and joined to the casing (8).

15. A damper comprising
    a) a substantially tubular casing (8) which has a central longitudinal axis (9) and an end (24) on the side of a tappet (17) and a free end (10);
    b) the tappet (17) which is displaceably guided in the casing (8) and projects from the end (10) on the side of the tappet (17), having a central longitudinal axis (18) and an end (23) inside the casing (8) and a free end (19);

c) fastening elements (12, 20) which are mounted on the free end (10) of the casing (8) and on the free end (19) of the tappet (17);

d) a frictional damping unit (26) for producing a given frictional damping effect between the casing (8) and the tappet (17); and e) a guiding damping unit (41; 41*b*; 41*c*) for damping and centering any deflection of the tappet (17) crosswise of the central longitudinal axis (9) of the casing (8), f) wherein the guiding damping unit (41; 41*b*; 41*c*) is composed of several damping elements (50; 50*b*; 50*c*) of annular arrangement, relative to the central longitudinal axis (9, 18), g) wherein each damping element (50; 50*b*; 50*c*) possesses at least one curved rib portion (51, 53; 51*b*, 53*b*; 51*c*, 53*c*) which is flexibly movable radially of the central longitudinal axis (9, 18), h) wherein the guiding damping unit (41; 41*b*; 41*c*) is disposed in vicinity of the end (24), on the side of the tappet, of the casing (8) and joined to the casing (8), and i) wherein the rib portions (51, 53; 51*b*, 53*b*; 51*c*, 53*c*) project inwards, j) wherein at least one rib portion (51*c*) is of two-piece design, producing a gap (72).

16. A damper according to claim 15, wherein at least one rib portion (51; 51*b*) is closed, enclosing a chamber (66; 66*b*) that is located there-behind, and that is open only in the radial direction.

17. A damper according to claim 15, wherein the tappet (17) has some play towards the rib portions (51*b*; 51*c*).

18. A damper comprising a) a substantially tubular casing (8) which has a central longitudinal axis (9) and an end (24) on the side of a tappet (17) and a free end (10);

b) the tappet (17) which is displaceably guided in the casing (8) and projects from the end (10) on the side of the tappet (17), having a central longitudinal axis (18) and an end (23) inside the casing (8) and a free end (19);

c) fastening elements (12, 20) which are mounted on the free end (10) of the casing (8) and on the free end (19) of the tappet (17);

d) a frictional damping unit (26) for producing a given frictional damping effect between the casing (8) and the tappet (17); and e) a guiding damping unit (41*b*; 41*c*) for damping and centering any deflection of the tappet (17) crosswise of the central longitudinal axis (9) of the casing (8), f) wherein the guiding damping unit (41*b*; 41*c*) is composed of several damping elements (50*b*; 50*c*) of annular arrangement, relative to the central longitudinal axis (9, 18), g) wherein each damping element (50*b*; 50*c*) possesses at least one curved rib portion (51*b*, 53*b*; 51*c*, 53*c*) which is flexibly movable radially of the central longitudinal axis (9, 18), h) wherein the guiding damping unit (41*b*; 41*c*) is disposed in the vicinity of the end (24), on the side of the tappet, of the casing (8) and joined to the casing (8), i) wherein the rib portions (51*b*; 51*c*) project inwards, j) wherein a guide rib (69) is disposed between two adjacent damping elements (50*b*; 50*c*), and k) wherein the rib portions (51*b*; 51*c*) stand out further in the direction towards the central longitudinal axis (9) than the guide ribs (69).

19. A damper according to claim 18, wherein at least one rib portion (51*b*) is closed,
enclosing a chamber (66*b*) that is located there-behind and that is open only in the radial direction.

20. A damper according to claim 18, wherein at least one rib portion (51*c*) is of two-pieced design, producing a gap (72).

21. A damper according to claim 18, wherein the tappet (17) has some play towards the rib portions (51*b*; 51*c*).

22. A damper according to claim 18, wherein a groove (71) of substantially radial extension is arranged between each damping element (50*b*; 50*c*) and the adjacent guide ribs (69) offering sufficient space for deformation of the rib portions (53*b*; 53*c*) upon compression.

23. A damper according to claim 18, wherein the guide rib (69) has inner surfaces (70) that are turned towards the central longitudinal axis (9) and have the cross-sectional shape of a radius around the axis (9).

* * * * *